US006624981B1

(12) United States Patent
Vigna

(10) Patent No.: US 6,624,981 B1
(45) Date of Patent: Sep. 23, 2003

(54) MICROMETRIC ACTUATION, HARD DISK READ/WRITE UNIT WITH A FLEXURE AND MICROACTUATOR FORMED IN A MONOLITHIC BODY OF SEMICONDUCTOR MATERIAL

(75) Inventor: Benedetto Vigna, Pietrapertosa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/512,148

(22) Filed: Feb. 23, 2000

(30) Foreign Application Priority Data

Feb. 23, 1999 (EP) .............................. 99830094

(51) Int. Cl.⁷ .............................. G11B 5/596; G11B 5/48
(52) U.S. Cl. .................................. 360/294.3; 360/244.2; 360/245.6
(58) Field of Search .......................... 360/294.3, 294.2, 360/294.1, 294, 294.5, 294.6, 294.7, 294.4, 244.2, 244.3, 245.6

(56) References Cited

U.S. PATENT DOCUMENTS

| 5,539,596 | A |   | 7/1996 | Fontana et al. |
| 5,657,188 | A |   | 8/1997 | Jurgenson et al. |
| 5,724,211 | A |   | 3/1998 | Higashiya et al. |
| 5,793,571 | A |   | 8/1998 | Jurgenson et al. |
| 5,802,701 | A |   | 9/1998 | Fontana et al. |
| 5,805,382 | A | * | 9/1998 | Lee et al. |
| 6,194,892 | B1 | * | 2/2001 | Lin et al. |
| 6,198,145 | B1 | * | 3/2001 | Ferrari et al. |
| 6,239,952 | B1 | * | 5/2001 | Bonin ............... 360/294.4 |
| 6,259,584 | B1 | * | 7/2001 | Cini et al. ........... 360/294.6 |
| 6,351,354 | B1 | * | 2/2002 | Bonin ............... 360/294.6 |

FOREIGN PATENT DOCUMENTS

EP          0 955 629        * 11/1999

OTHER PUBLICATIONS

Ohwe, T. et al., "Development of Integrated Suspension System for a Nanoslider with an MR Head Transducer," *IEEE Transactions on Magnetics* 29(6): 3924–3926, Nov. 1993.

Ohwe, T. et al., "A New Integrated Suspension for Pico–Sliders (Pico–Caps)," *IEEE Transactions on Magnetics* 32(5):3648–3650, Sep. 1996.

* cited by examiner

Primary Examiner—Craig A. Renner
(74) Attorney, Agent, or Firm—Lisa K. Jorgenson; Robert Iannucci; Seed IP Law Group PLLC

(57) ABSTRACT

A hard disk read/write unit is formed in a monolithic body of semiconductor material, including a suspension structure, a coupling or flexure element integral with the suspension structure, and a microactuator, integral with the coupling. The monolithic body has a first portion accommodating integrated electronic components, and a second portion, accommodating the coupling and the microactuator. The coupling is formed from a central region, accommodating the microactuator; an annular region, separated from the central region by a first trench, and from the suspension by a second trench; a first pair of suspension arms, extending between the central region and the annular region, along a first axis; and a second pair of suspension arms, extending between the annular region and the suspension structure, along a second axis perpendicular to the first axis. The first and second pair of arms, with a reduced thickness, impart to the coupling yielding for rotations around the first and second axes of the central region.

16 Claims, 5 Drawing Sheets

MICROMETRIC ACTUATION, HARD DISK READ/WRITE UNIT WITH A FLEXURE AND MICROACTUATOR FORMED IN A MONOLITHIC BODY OF SEMICONDUCTOR MATERIAL

TECHNICAL FIELD

The present invention relates to hard disk systems, and in particular to a micrometric actuation, hard disk read/write unit.

BACKGROUND OF THE INVENTION

As known, hard disks are the most commonly used means of storing data in personal computers. Consequently they are produced in very large volumes, and the maximum data storage density is increasing year by year. Hard disks are read and written by actuator devices, the general structure whereof is shown in FIGS. 1 and 2 and is described hereinafter.

In particular, FIG. 1 shows a known actuator device 1 of a rotary type, comprising a motor 2 (also called a voice coil motor), secured to a support body 3, generally called E-block, owing to its shape as an "E" in lateral view (see, e.g., FIG. 2). The support body 3 has a plurality of arms 4, each of which supports a suspension 5, formed from a steel plate, and secured in a projecting manner. At an end not secured to the support body 3, each suspension 5 supports a coupling 8 (called a gimbal or a flexure), also made of steel, which in turn supports a read/write transducer 6 (called a slider), which (in the operative condition) faces a surface of a hard disk 7.

The slider 6 comprises a support body, a bearing secured thereto, and a magneto/resistive and inductive read/write (R/W) head 91 that forms the actual reading and writing device. Electric wires (not shown) extend from the R/W head 91, along a coupling 8 and the suspension 5, as far as a signal processing device (also not shown), secured to a main board of a personal computer or other device that contains hard disks for data storage.

To prevent the read/write signal from becoming excessively attenuated, to ensure that it has sufficient amplitude for reading/writing of the hard disk 7, and also to prevent the hard disk 7 from being damaged by the slider 6, the slider 6 must be maintained at a predetermined distance (which at present is 20–30 nm) from, and parallel to, the hard disk 7. Consequently, the suspension 5 has a degree of freedom in a vertical direction, to regulate the distance of the slider 6 from the hard disk 7. The coupling 8 has two degrees of freedom around two axes φ and ψ in a horizontal plane, and can carry out pitch and roll movements, to maintain the slider 6 parallel to the hard disk 7 even in presence of roughness and non-planar points. In particular, the suspension 5 should support the weight of the slider 6 (now 1.5 mg), and should also be able to oppose pressure generated on the surface of the slider 6 by air interposed between the hard disk 7 and the slider 6 and biasing the slider 6 away from the disk 7 during movement of the hard disk 7 and/or the actuator device 1.

For this purpose, after assembling the various components, the suspension 5 is permanently bent, exploiting plastic deformation characteristics of steel. If the suspension is bent too much or too little, the bending error cannot be corrected, and it is necessary to scrap the suspension 5 and the elements secured to it (e.g., the flexure 8 and the slider 6). Now, the assembly process, including the above-described bending step, has an output efficiency of 65–75%, giving rise to high costs for scrap. Furthermore, in some cases, the bending error is detected only upon completion of installation on the hard disk 7, thus further aggravating the problem of costs.

In currently commercially available hard disk read/write devices, the slider 6 is glued directly to the coupling 8. To obtain more accurate and finer control of the position of the slider 6, it has already been proposed to use a double actuation step, with a first, courser actuation stage, including the motor 2, displacing the assembly formed by support body 3, suspension 5, flexure 8 and slider 6, across the hard disk 7, during the approximate track search, and a second actuation stage, effecting a finer control of the position of the slider 6, during tracking.

Hitherto, two solutions have been proposed. According to a first solution, the suspension 5 or the support body 3 is modified, such as to control in a micrometric manner the position of the suspension 5. According to a second solution, the position of the slider 6 with respect to the end of the suspension 5 is controlled through a microactuator, interposed between the slider 6 and the coupling 8.

An example of an embodiment of a microactuator 9 of a rotary electrostatic type, usable for the second micrometric actuation solution, is represented schematically in FIG. 3, wherein only part of the microactuator 9 is completely shown, owing to the axial symmetry. The microactuator 9 comprises a stator 17, integral with a dice integrating the microactuator 9 and glued to the coupling 8, and a rotor 11, capacitively connected to the stator 17, to be glued to the slider 6 (see, e.g., FIG. 2).

The rotor 11 comprises a suspended mass 12, of a substantially circular shape, and a plurality of mobile arms 13, extending radially towards the exterior from the suspended mass 12. Each mobile arm 13 supports a plurality of mobile electrodes 14, extending in a substantially circumferential direction and equidistant from one another. The rotor 11 also comprises resilient suspension and anchorage elements (spring 15), to support and bias the rotor 11 via fixed regions 16.

The stator 17 comprises a plurality of fixed arms 18, 19, extending radially and supporting each a plurality of fixed electrodes 20. In particular, each mobile arm 13 is associated to a pair of fixed arms, formed by a fixed arm 18 and a fixed arm 19. The fixed electrodes 20 of each pair of fixed arms 18, 19 extend towards the associated mobile arm 13, and are intercalated or interdigitated with the mobile electrodes 14. The fixed arms 18 are all arranged on a single side of the respective mobile arms 13 (on the right, in the example of FIG. 3), and are all biased to the same potential, via biasing regions 21. Similarly, the fixed arms 19 are all arranged on the other side of the respective mobile arms 13 (on the left, in the example of FIG. 3), and are all biased to the same potential via biasing regions 22.

The fixed arms 18 and 19 are biased to different potentials, so as to generate two different potential differences with respect to the mobile arms 13, and to cause rotation of the rotor 11 in one direction or the other.

However, the insertion of the microactuator 9 between the coupling 8 and the slider 6 causes a reduction in the assembly output of the read/write device, because of the criticalities of the microactuator 9.

SUMMARY OF THE INVENTION

An embodiment of the invention provides a read/write unit not affected by the above-described disadvantages.

According to embodiments of the present invention, a read/write unit for hard disks and a manufacturing method are provided, as defined in the claims.

BRIEF DESCRIPTION OF THE DRAWINGS

To help in the understanding of embodiments of the present invention, an embodiment is now described, purely by way of non-limiting example, with reference to the attached drawings, wherein.

In the figures, like reference numerals refer to like parts throughout the various views, unless otherwise indicated.

DETAILED DESCRIPTION

Figure 4:
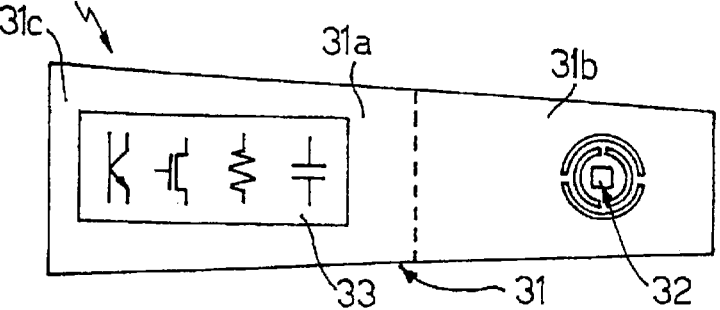
FIG. 4 shows a plan view of a read/write unit according to an embodiment of the invention.

As shown in FIG. 4, a read/write unit 30 comprises a monolithic body 31 of semiconductor material and a R/W transducer 32, glued to the monolithic body 31. In plan view, the monolithic body 31 has a substantially trapezoidal shape, divided, from a functional point of view, into a first portion 31a, extending from the larger base of the monolithic body 31, along part of the trapezium, and a second portion 31b, arranged at the other part of the trapezium, close to the smaller base, and supporting the R/W transducer 32.

Figure 1:
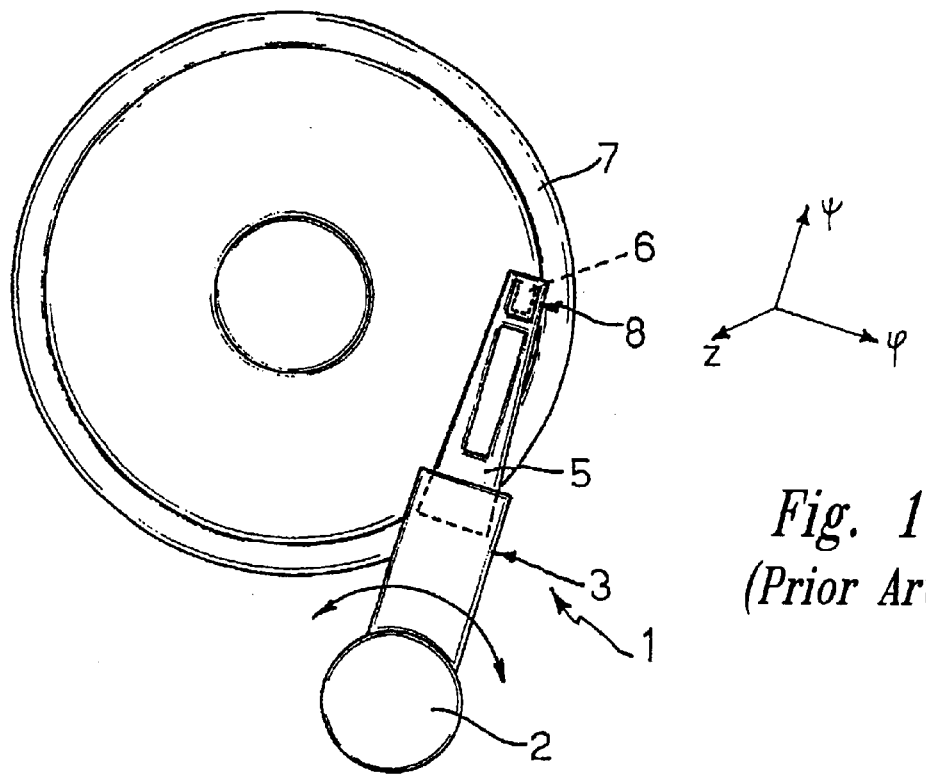
FIG. 1 shows a plan view of an actuator device of a known type, for hard disks.
Figure 5:
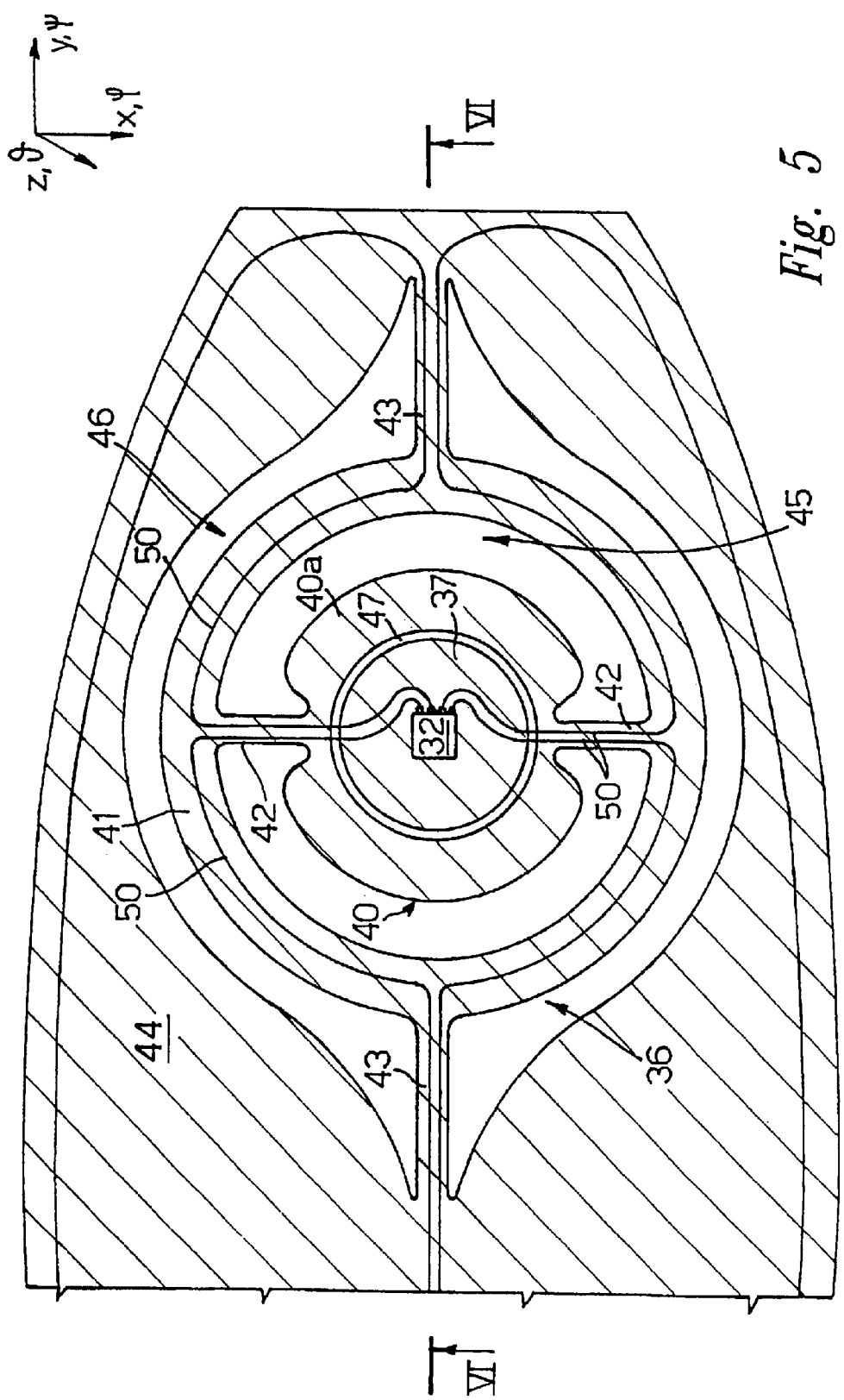
FIG. 5 is a plan view of a portion of the read/write unit of FIG. 4, in an enlarged scale.
Figure 6:
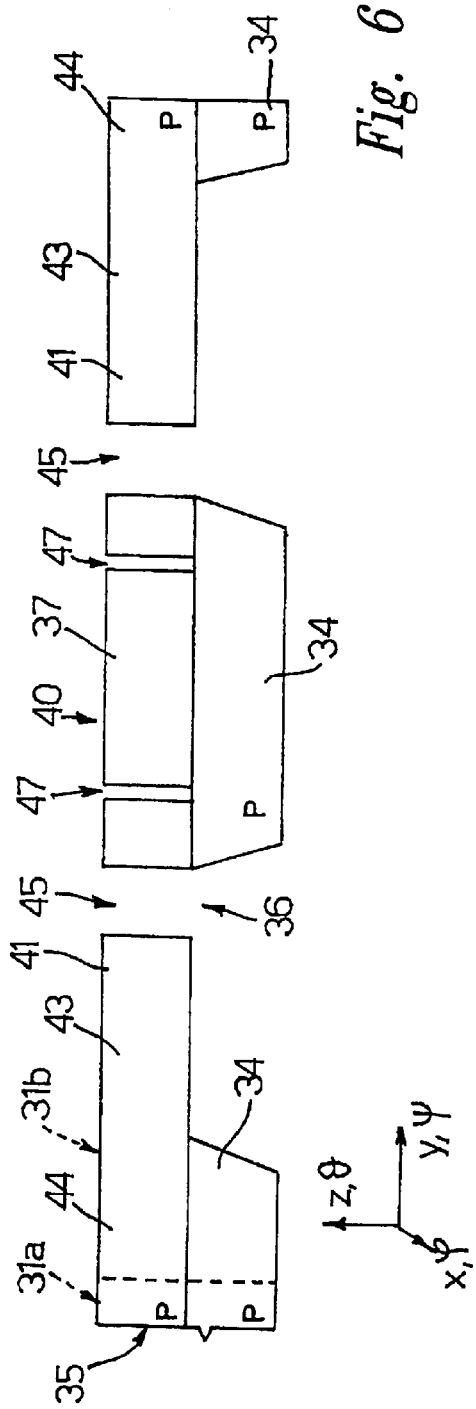
FIG. 6 is a cross-section of the portion of FIG. 5, taken along line VI—VI of FIG. 5.

As shown in FIG. 6, the monolithic body 31 is made of semiconductor material (for example silicon) formed by a substrate 34, partially removed in the second portion 31b, and by an epitaxial layer 35, both of which, for example, being of P type. In the first portion 31a, the epitaxial layer 35 accommodates electronic components (shown schematically in FIG. 4 and forming a signal pre-processing circuit 33), and in the second portion 31b, a flexure structure 36 and a microactuator 37 (see, e.g., FIGS. 5 and 6). Thus, the suspension, the flexure and the microactuator, which in the known solution of FIG. 1 are separate elements, are here integrated in the monolithic body 31.

Figure 2:
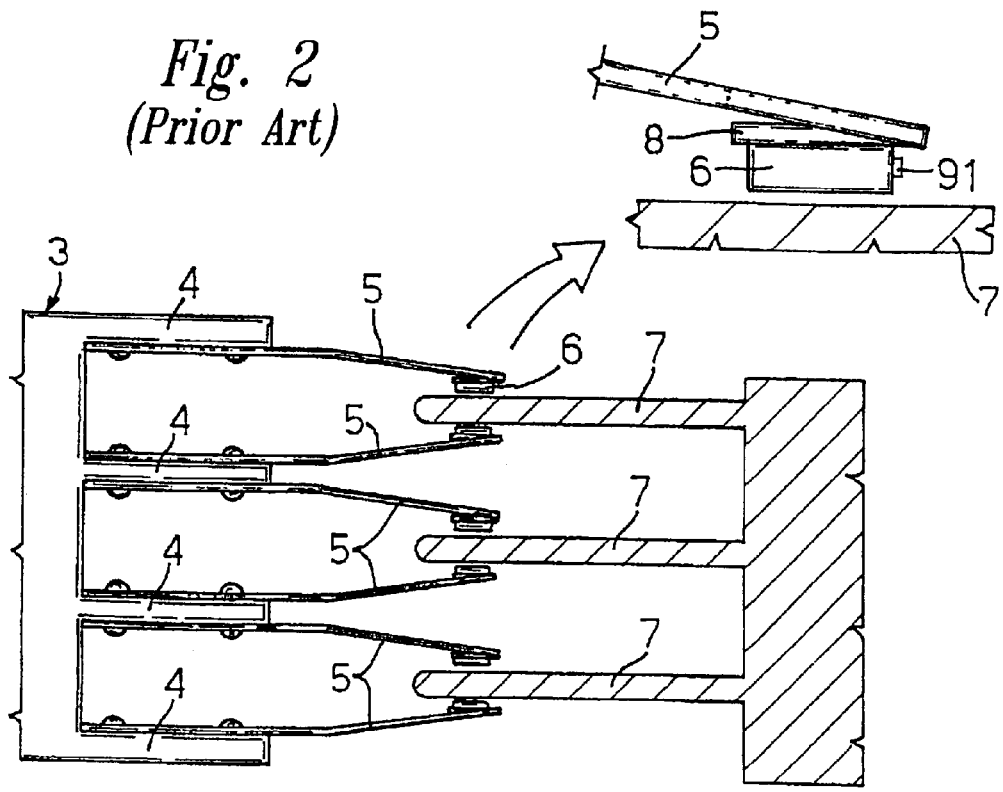
FIG. 2 is an enlarged, partially broken lateral view of the actuator device of FIG. 1.

In addition, the monolithic body 31 also advantageously forms the circuitry necessary for pre-processing the signals supplied by the R/W transducer 32 and for processing the position control signals of the microactuator 37. The end of the first portion 31a (near the larger base of the trapezoidal shape of monolithic body 31 of FIG. 4), forms a securing portion 31c, where the unit 30 is secured to a support arm similar to the support arms 4 shown in FIGS. 1 and 2.

With reference to FIGS. 5 and 6, the flexure structure has been obtained by selectively removing part of the epitaxial layer 35 of the second portion 31b, to provide the required flexibility for the rotations around axes $\phi$ and $\psi$ (e.g., for the pitch and roll). In detail, the flexure structure 36 comprises a central region 40 with a substantially double cardioid shape, surrounded by a first trench 45; an annular region 41, arranged outside the central region 40, internally delimiting the first trench 45 and externally delimited by a second trench 46; a first pair of suspension arms 42, extending through the first trench 45 along an axis x between a respective recessed portion of the central regions 40 and the annular region 41; and a second pair of suspension arms 43, extending through the second trench 46 along an axis y, between the annular region 41 and the remainder of the second portion 31b, thus making up a suspension 44 of the read/write unit 30. The second pair of suspension arms 43 is thus arranged at right angles to the first pair of suspension arms 42. Therefore, the central region 40, supported by the suspension 44 through the flexure structure 36, is flexible around the axes x and y. On the other hand, the suspension arms 42, 43 are more rigid than the microactuator 37, for rotations around an axis $\vartheta$ (as described hereinafter).

A third trench 47, of annular shape, extends throughout the thickness of the epitaxial layer 35 and electrically isolates the outermost area 40a of the central region 40 from the innermost region, forming the microactuator 37, which is represented only schematically in FIGS. 5 and 6, and is described in detail hereinafter with reference to FIGS. 7 and 8.

FIG. 5 also shows four transducer connection lines 50, for electrically connecting the R/W transducer 32 to the signal pre-processing circuit 33 in the first portion 31a (not shown in FIG. 5). In detail, the four transducer connections lines 50 start from the first portion 31a, in a manner not shown; extend, in pairs, on the second pair of suspension arms 43; along a respective quadrant of the annular region 41; then, in pairs again, along the first pair of suspension arms 42; above the inner region 40; above the third trench 47, through floating connections not modifying the mechanical characteristics of the system; and finally, above the microactuator 37 (in the manner described hereinafter with reference to FIG. 7 for the transducer connection line 50), as far as the R/W transducer 32.

As can be seen in FIG. 6, the substrate 34 is present, in the second portion 31b, only below the suspension 44, to provide the latter with the correct rigidity in the direction z, and below the central region 40, to allow biasing of the microactuator 37, as described in greater detail hereinafter.

Figure 3:
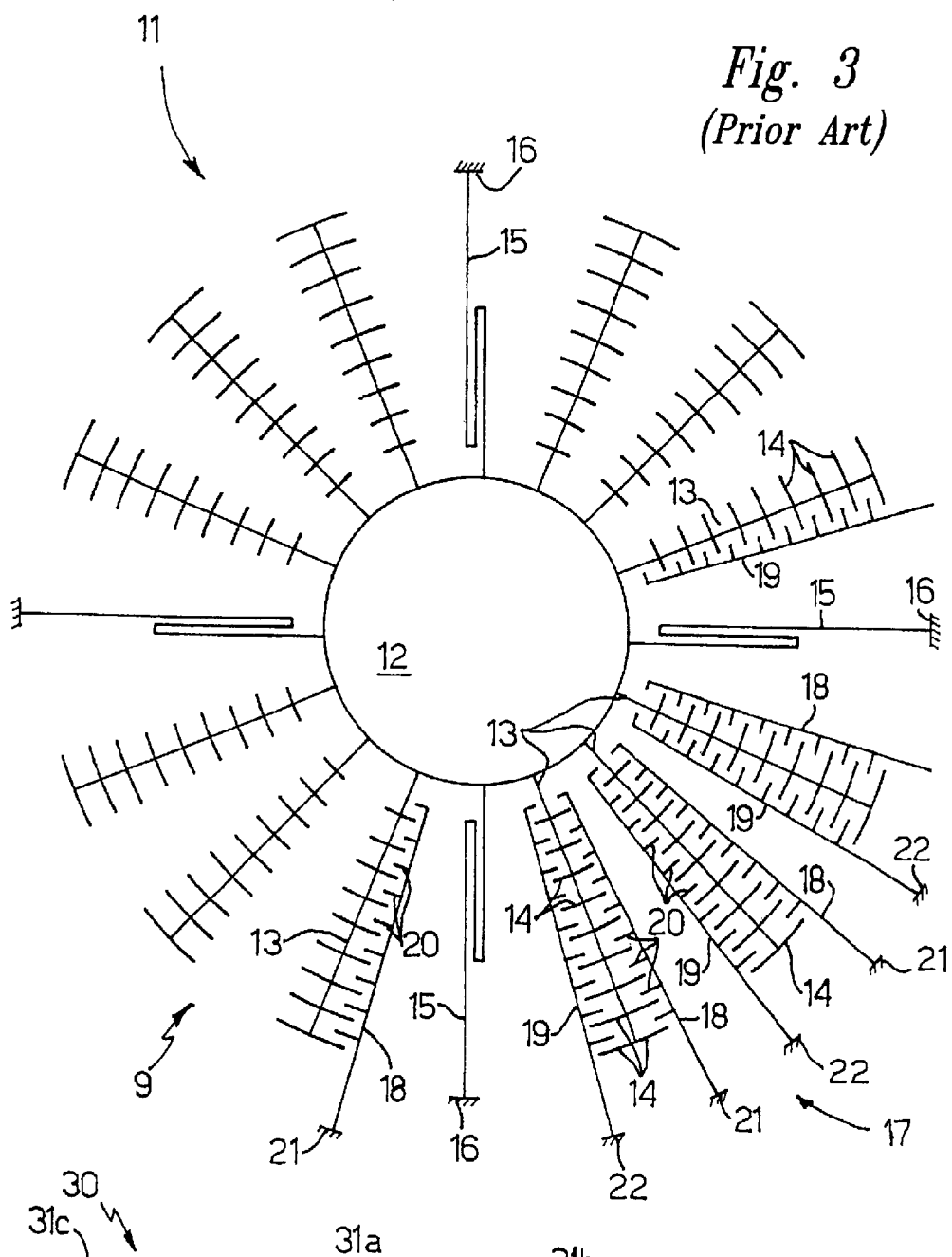
FIG. 3 is a schematic representation of an integrated microactuator of a known type.
Figure 8:
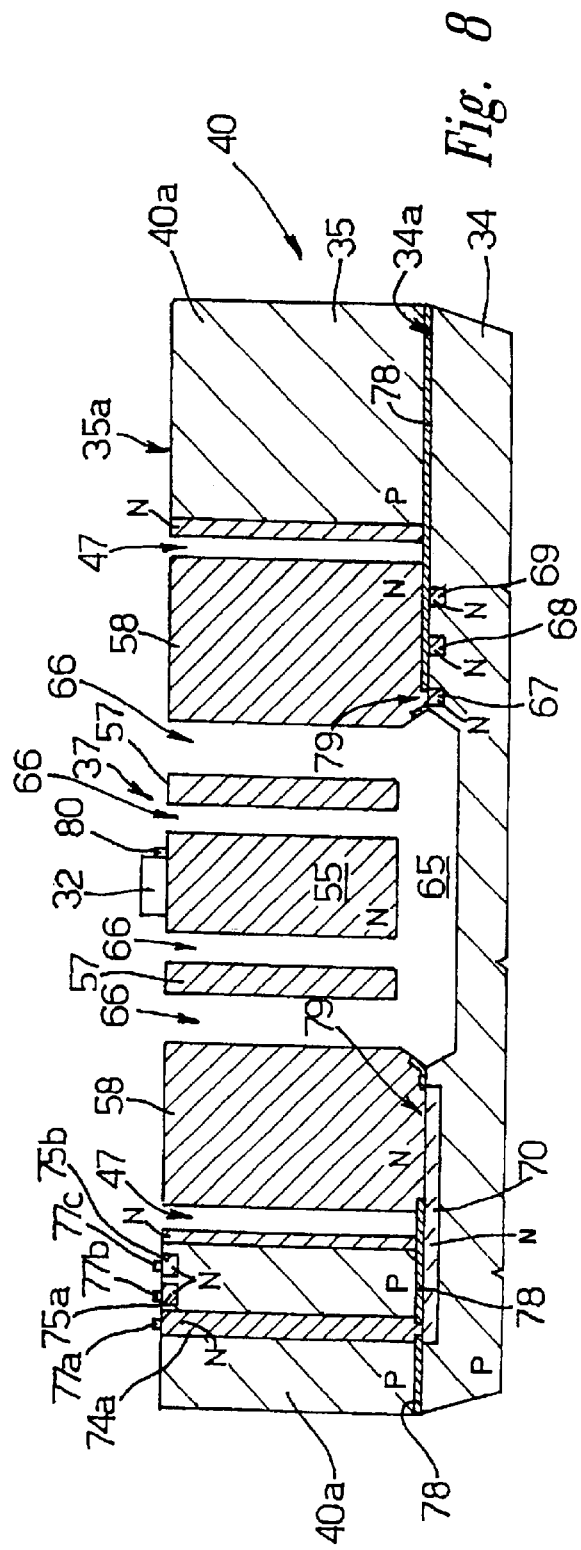
FIG. 8 shows a cross-section of the detail of FIG. 7, taken along line VIII—VIII of FIG. 7.
Figure 7:
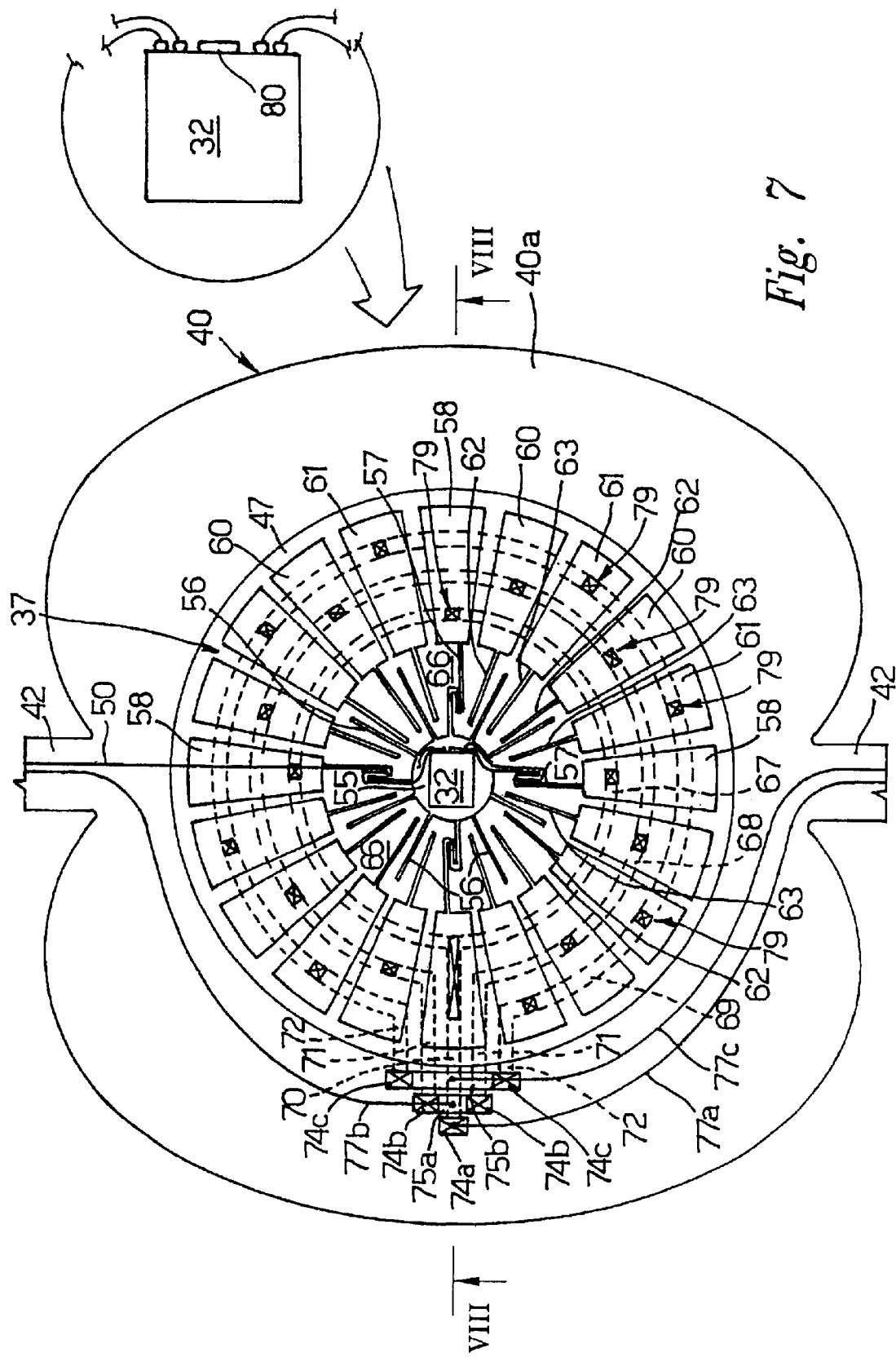
FIG. 7 shows in detail of the portion of FIG. 5, in an even larger scale.

FIGS. 7 and 8 show in greater detail the physical structure of the microactuator 37, similar to the microactuator 9 of FIG. 3. However, for greater clarity, the fixed and mobile electrodes 20, 14 are not shown in FIGS. 7 and 8. The microactuator 37 comprises a suspended mass 55 (corresponding to the suspended mass 12 of FIG. 3), mobile arms 56 and springs 57, extending from the suspended mass 55 and forming together the rotor of the microactuator 37. The springs 57 are supported by respective first annular segments 58 (corresponding to the biasing regions 16 of FIG. 3), alternating with second and third annular segments 60, 61 (corresponding to the regions 21 and 22), from which there extend fixed arms 62 and 63, forming the stator of the microactuator 37.

An air gap 65 (see, e.g., FIG. 8) is arranged between the suspended mass 55, the springs 57 and the mobile arms 56 on the one hand, and the substrate 34 on the other hand. The air gap 65 is obtained by removing a sacrificial region (for example silicon oxide), via a fourth trench 66, which separates the suspended mass 55, the mobile arms 56, and the springs 57, from the stator (elements 60–63). On the other hand, removal of the substrate 34 below the suspension arms 42, 43 and the annular region 41 of the flexure structure 36

(see, e.g., FIG. 6) is carried out by masked isotropic etching, from the rear of the wafer from which the read/write unit 30 is obtained.

The annular segments 58, 60, 61 have a conductivity of a type opposite to that of the epitaxial layer 35, and thus of N type, and are biased by respective first, second and third buried biasing regions 67, 68 and 69, also of N type and annular shape. The buried biasing regions 67, 68, 69 extend in the substrate 34, to a surface 34a of the substrate 34 facing the epitaxial layer 35. In detail, as shown in FIG. 8, between the surface 34a of the substrate 34 and the epitaxial layer 35, in the central region 40, a dielectric material layer 78 (for example silicon nitride) electrically isolates the annular segments 58, 60 and 61 from the substrate 34 and from the buried biasing regions 67–69, except at predetermined areas 79 (shown schematically in FIG. 7 visible only for two of the first annular segments 58 of FIG. 8), where each annular segment 58, 60 and 61 is in electrical contact with the respective buried biasing regions 67, 68 and 69.

The buried biasing regions 67, 68 and 69, are arranged concentrically to each other around the air gap 65. More specifically, the first buried biasing region 67, connected to the first annular segments 58, is innermost and forms a closed loop electrically connected to a first connection section 70, extending radially towards the exterior. The second buried biasing region 68, connected to the second annular segments 60, extends towards the exterior, is spaced from the first buried biasing region 67, has an open shape, so as not to touch the first connection section 70, and is electrically connected to two second connection sections 71, extending in parallel and on both sides of the first connection section 70. The third buried biasing region 69, connected to the third annular segments 61, extends towards the exterior, is spaced from the second buried biasing region 68, has an open shape, so as not to touch the second connection sections 71, and is electrically connected to two third connection sections 72, extending in parallel and on both sides of the second connection sections 71.

As can be seen in FIG. 8, the first connection section 70 is electrically connected to a sinker region 74a of N type and extends throughout the depth of the epitaxial layer 35, as far as its surface 35a, where the sinker region 74a is in electrical contact with an actuator connection line 77a. In a similar manner, shown only schematically in FIG. 7, the second and third connection sections 71 and 72 are connected to respective pairs of sinker regions 74b, 74c, extending throughout the depth of the epitaxial layer 35 as far as its surface 35a, where the sinker regions 74b, 74c of each pair are connected to respective surface connections 75a, 75b (see, e.g., FIG. 8). Finally, the surface connection regions 75a, 75b are connected to respective actuator connection lines 77b and 77c. The actuator connection lines 77c–77c then extend on the surface of the epitaxial layer 35, and similar to the transducer connection lines 50, extend on the first suspension arms 42, on the annular region 41, and on the second suspension arms 43, as far as the signal pre-processing circuit 33, in a manner not shown.

The R/W transducer 32 is glued to the suspended mass 55 and is electrically biased via the transducer electrical connections 50. The latter extend in pairs on two opposite springs 57, as shown fully in FIG. 7 only, for a transducer connection line 50. The transducer connection lines 50 are connected, by ball bonding, to pads (not shown) formed on a head 80, of magneto/resistive and inductive type, defining the actual read/write device.

In the read/write unit 30, by removing the substrate 34 below the suspension arms 42, 43 and the annular region 41, and by providing the suspension arms 42, 43 with appropriate dimensions, it is possible to manufacture a flexure structure 36 with the required rigidity, which, in use, allows the R/W transducer 32 to follow the surface of the facing hard disk. Similarly, the dimensions of the springs 57 of the actuator are such as to impart the required rigidity for rotations around the axis $\vartheta$. In particular, the dimensions of the various parts are designed so that the suspension arms 42, 43 have greater rigidity than the springs 57 of the microactuator 37 as regards rotations round the axis $\vartheta$, and greater yielding for rotations around the axes $\phi$ and $\psi$. Therefore, the first suspension arms 42 allow pitch movements, whereas the second suspension arms 43 allow roll movements, thus causing the R/W transducer 32 to follow the surface of the facing hard disk 7. On the other hand, mobility of the read/write unit 30 around the axis $\vartheta$, to allow an accurate positioning of the head 80, is provided by the springs 57 of the microactuator 37, and the position in the direction of the axis z is provided by the geometric shape of the unit 30, and optionally by the angle at which the unit 30 is secured to the support body 3.

For manufacturing the read/write unit 30, a sacrificial region, where the air gap 65 must be provided, is initially formed on substrate 34. For example, the sacrificial region can comprise a thick oxide region (field oxide), thermally grown using a silicon nitride mask. The silicon nitride mask is then removed selectively, where it is no longer necessary (in the first portion 31a of the monolithic body 31), and at the contact areas 79. The epitaxial layer is then grown, and the various conductive regions necessary for the components of the signal pre-processing circuit 33 are then formed. In this step, the second portion 31b of the monolithic body 31 is selectively doped, to form the buried regions 74a–74c and to dope the inner part of the central region 40, intended to form the microactuator 37, with doping agents of N type.

At the end of the step for forming the signal pre-processing circuit 33, the trenches 45–47, 66 are formed, and the sacrificial material layer is removed below the microactuator 37, through the trench 66, thus forming the air gap 65. Subsequently (or before forming the trenches 45–47, 66) the substrate is selectively removed, from the rear, below the area of the suspension arms 42, 43, and below the annular region 41. Finally, the connections are formed in a known manner.

The read/write unit 30 has the following advantages. First, it eliminates the problems of electro-mechanical connection between the microactuator 37 and the suspension 44, since these are integrated in a monolithic body. In addition, it is more reliable than the known solutions. In fact, since it is produced in a monolithic body of silicon, which is a fragile material, it is not resiliently deformed during the manufacture and the subsequent handling, and a simple visual check is sufficient to distinguish the intact units from the damaged ones. The lack of the suspension bending and coupling and microactuator gluing operations also makes it possible to obtain a higher production output than at present.

The described read/write unit 30 has, integrated into a single monolithic body, the pre-processing circuit 33 for the signal supplied by the head 80 (pre-amplifier stage), and the electrical connection lines 50, 77c–77c, which can thus be produced in a standard manner in microelectronics, as conductive tracks of metal material, extending above the epitaxial layer 35, and isolated by insulating material regions (for example silicon oxide).

By virtue of manufacturing the connection lines by microelectronics techniques and the shorter distance between the head 80 and the respective pre-processing circuit 33, it is possible to reduce the parasitic inductances and capacitances associated with the connection lines 50, 77c–77c, and thus to increase the passband of the connection lines. Thus, the hard disk reading/writing speed is increased.

The read/write unit 30 has reduced production costs. In fact, all the costs for assembling electro-mechanically the suspension 5 to the coupling 8 (see, e.g., FIG. 2), and the coupling 8 to the microactuator 9 (see, e.g., FIG. 3), are substantially reduced or eliminated. In addition, the costs for manufacturing the connections between the preprocessing circuit 33, the suspension 44 and the coupling 36, are lower than those necessary to produce the similar connections on the metal structures of the coupling and of the suspension in the known actuator devices. Finally, securing the transducer 6 to the microactuator 37 can be automated, using bonding techniques conventional in microelectronics, thus allowing automation of the entire assembly operation.

The use of process steps typical of microelectronics, for production of the entire read/write unit 30, makes it possible to obtain greater freedom in designing the unit, as well as to reduce the vertical space. Thus, an increased aerodynamic efficiency and a reduced distance among the hard disks 7 may be obtained. Therefore, the hard disk units may be more compact. In addition, forming the suspension and the coupling from semiconductor material, instead from steel, reduces their weight, thus making it possible to position the R/W transducer 32 more accurately, and therefore, to produce hard disks with a higher tracking density. The data storage capacity of each hard disk is consequently increased.

Finally, it is apparent that many changes and variations can be made to the read/write unit described and illustrated here, all of which come within the scope of the invention. Therefore, the scope of the invention is not limited by the description herein. Instead, the scope of the invention is to be defined by the following claims, which are to be construed in accordance with established doctrines of claim interpretation.

What is claimed is:

1. A hard disk read/write unit, comprising:
   a motor;
   an elongated suspension structure movably coupled to, and moved by, the motor;
   a flexure element integral with said elongated suspension structure;
   a microactuator integral with said flexure element, wherein said microactuator includes a stator element fixed to the flexure element and a rotor element capacitively coupled to the stator element; and
   a read/write transducer secured to the rotor element of said microactuator, wherein said elongated suspension structure, said flexure element and said microactuator are formed in a monolithic body of semiconductor material.

2. The unit according to claim 1 wherein said monolithic body comprises a first portion and a second portion, said first portion comprising a securing portion, and said second portion accommodating said flexure element and said microactuator.

3. The unit according to claim 2 wherein said first portion of said monolithic body accommodates integrated electronic components.

4. The unit according to claim 1 wherein the stator element and the rotor element are both formed in an epitaxial layer arranged above a substrate, wherein an air gap extends between said rotor element and said substrate, and said transducer is secured to said rotor element.

5. The unit according to claim 4 wherein said rotor element comprises a suspended mass, connected to fixed regions of said epitaxial layer, via spring elements having predetermined yielding for rotations around a perpendicular axis to a surface of said monolithic body.

6. The unit according to claim 5, further comprising:
   transducer connection lines extending on said surface and on said spring elements; and
   actuator connection lines connected to said stator element and said rotor element via buried regions.

7. A hard disk read/write unit, comprising:
   a suspension structure;
   a flexure element integral with said suspension structure;
   a microactuator integral with said flexure element; and
   a read/write transducer secured to said microactuator, wherein said suspension structure, said flexure element and said microactuator are formed in a monolithic body of semiconductor material, wherein said flexure element comprises a central region accommodating said microactuator, said central region being surrounded by a first trench and being connected to said suspension structure by support elements having predetermined yielding in two directions at right-angles to each other, said support elements being parallel to a surface of said monolithic body.

8. The unit according to claim 7 wherein said flexure element further comprises:
   an annular region surrounding said central region, said annular region being separated from said central region by said first trench and from said suspension structure by a second trench;
   a first pair of suspension arms extending between said central region and said annular region, along a first axis; and
   a second pair of suspension arms extending between said annular region and said suspension structure, along a second axis, perpendicular to said first axis, wherein said first and second pairs of suspension arms and said annular region have a smaller thickness than said central region.

9. The unit according to claim 8 wherein said monolithic body comprises a substrate and an epitaxial layer, and wherein said substrate is removed selectively below said first and second pairs of suspension arms and below said annular region.

10. The unit according to claim 8, further comprising transducer connection lines and actuator connection lines, extending on said surface of said monolithic body, above said suspension structure, on said second pair of suspension arms, on said annular region, on said first pair of suspension arms and on said central region, said transducer connection lines being electrically connected to said transducer, and said actuator connection lines being electrically connected to said microactuator.

11. A hard disk read/write unit comprising:
    a motor;
    an elongated suspension element structured in a semiconductor substrate, movably coupled to the motor, and having an integrated flexure element, the integrated flexure element including an integrated microactuator; and
    a first pair of suspension arms extending, inline along a first axis, between an annular region and the elongated suspension element, and each suspension arm of the first pair of suspension arms having a thickness sufficient to allow rotation, about the first axis, of the annular region, a second pair of suspension arms, and a central region, and the second pair of suspension arms extend inline along a second axis, between the annular region and the central region, and each suspension arm of the second pair of suspension arms having a thickness sufficient to allow rotation of the central region about the second axis.

12. A hard disk read/write system, comprising:

a voice coil motor;

an elongated suspension structure having first and second end portions, the first end portion being mechanically coupled to the voice coil motor;

a flexure element integral with and supported by the second end portion of the elongated suspension structure, that flexure element having a central region;

a microactuator integral with and supported on the central region of the flexure element; and a read/write transducer secured to the microactuator, wherein the elongated suspension structure, the flexure element and the microactuator are formed in a monolithic body of semiconductor material.

13. The system of claim 12, further comprising integrated electronic components disposed in a first portion of the monolithic body.

14. The system of claim 12 wherein the central region of said flexure element is surrounded by a first trench and is connected to the elongated suspension structure by support elements having yielding in two directions at right-angles to each other, the support elements being parallel to a surface of the monolithic body.

15. The system of claim 12 wherein said microactuator comprises a stator element and a rotor element, both formed in an epitaxial layer arranged above a substrate, wherein an air gap extends between the rotor element and the substrate and the transducer is secured to the rotor element.

16. A read/write apparatus for a computer storage medium, comprising:

a motor;

a support body coupled to the motor;

a read/write transducer;

a microactuator structured to support and actuate the read/write transducer;

flexible support means for flexibly suspending the microactuator and read/write transducer from the support body to allow the microactuator to rotate in two orthogonal axes with respect to the motor, the flexible support means and the microactuator being structured in a common semiconductor substrate.

* * * * *